J. W. GRAYDON.
Coupling for Railroad Car Heating Pipes.
No. 212,374. Patented Feb. 18, 1879.
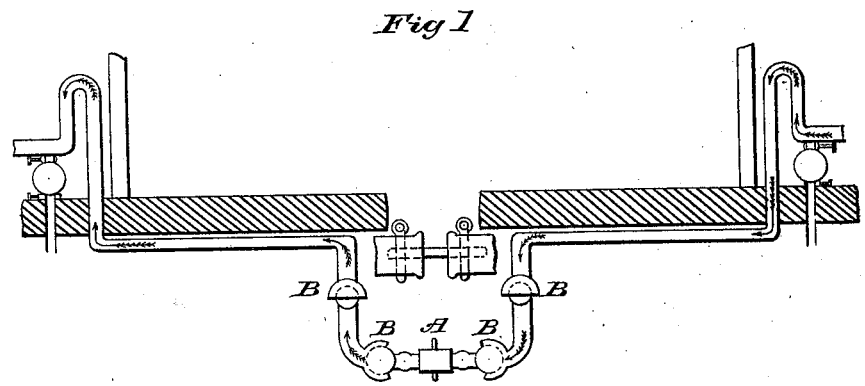
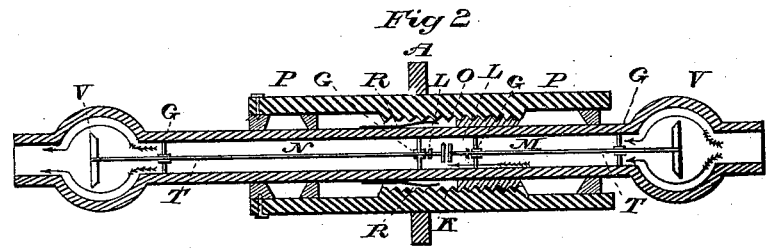
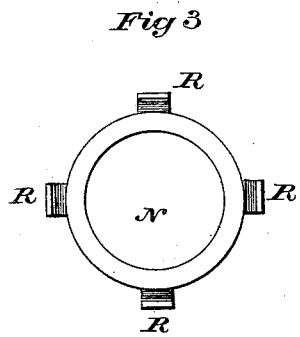
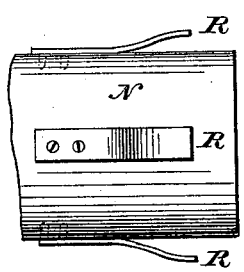
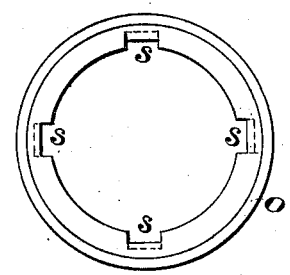
Witnesses:
Inventor:
James W. Graydon.

UNITED STATES PATENT OFFICE.

JAMES W. GRAYDON, OF WASHINGTON, DISTRICT OF COLUMBIA, ASSIGNOR TO THE GRAYDON SAFETY RAILROAD CAR HEATING COMPANY.

IMPROVEMENT IN COUPLINGS FOR RAILROAD-CAR HEATING-PIPES.

Specification forming part of Letters Patent No. 212,374, dated February 18, 1879; application filed June 27, 1878.

*To all whom it may concern:*

Be it known that I, JAMES W. GRAYDON, of Washington, District of Columbia, have invented a new and useful Improvement in Railroad-Car Heating Apparatus, which invention more particularly relates to an improvement on the flexible metallic connection between the cars patented by me May 14, 1878, No. 203,611; and the following is a full and exact description thereof.

The invention consists of an improved coupling, by means of which the pipes automatically uncouple when the cars separate for any cause whatever, and at the same time the pipes are automatically closed, preventing the escape of steam.

In describing this invention it will be necessary to show in the drawings the old and the new parts.

In the accompanying drawings, in which similar letters of reference indicate like parts, Figure 1 is a vertical longitudinal section of the platforms of two adjoining cars, showing the flexible joints B B B B and coupling A, with the connecting-pipes. Fig. 2 is a vertical longitudinal section of the coupling A and the pipes N M.

The cylindrical part of the coupling A, with the screw-thread cut on the interior, and the pipes N M, are old. The ring O, springs R R, valves V V, valve-stems T T, guides G G G G, and projections L L on the valve-stems are new as combined.

Fig. 3 is an enlarged end view of the pipe N, showing the position of the springs R R R R. Fig. 4 is an enlarged side view of the pipe N, showing the position of the springs R R R R. Fig. 5 is an enlarged end view of the ring O, showing the indentations S S S S on the interior, in which indentations the springs R R R R move when the ring O is placed on the end of the pipe N.

On the outer surface of this ring a screw-thread is cut, as represented in the view of the ring in Fig. 2.

The operation of the device is as follows: The ring O is placed on the end of the pipe N, the springs R R R R retaining it in its place under ordinary circumstances, but being of sufficient elasticity to liberate the ring when any unusual strain is brought on the pipes. When coupling the pipes together the coupling A is manipulated as in patent bearing date May 14, above referred to. As the pipes come together the ends of the valve-stems T T meet each other, and thus open the valves V V. The projections L L are thus made to meet the guides G G, and therefore keep the valves open, allowing the steam a free passage from one side to the other. In uncoupling, ordinarily, the coupling is manipulated as in patent above referred to, and as the ends of the pipes N M separate, the valve-stems T T are liberated, and the pressure of the steam from each car presses the valves V V into their seats, thus preventing the escape of steam. Should the cars separate when the pipes are coupled, the ring O, when sufficient force is brought to overcome the springs R R R R, slips from the pipe N as the pipe N is withdrawn from the coupling, the ring remaining in the coupling. The valve-stems T T being thus liberated, the valves V V are closed by the pressure of steam as when uncoupling ordinarily.

What I claim as new, and desire to secure by Letters Patent, is—

1. The combination of the ring O, springs R R R R, and pipes N M, for the purpose set forth, and substantially as described.

2. The combination of the valves V V, valve-stems T T, guides G G G G, and projections L L, for the purpose set forth, and substantially as described.

JAMES W. GRAYDON.

Witnesses:
   WM. H. CHASE,
   G. Y. AT LEE.